United States Patent [19]

Endo et al.

[11] Patent Number: 4,749,623

[45] Date of Patent: Jun. 7, 1988

[54] COMPOSITE METAL SHEET WITH ORGANIC AND METAL INTERMEDIATE LAYER

[75] Inventors: Hiroshi Endo; Mizuo Ejima; Yoshimasa Zama, all of Sagamihara, Japan

[73] Assignee: Nippon Steel Corporation, Tokyo, Japan

[21] Appl. No.: 919,065

[22] Filed: Oct. 15, 1986

[30] Foreign Application Priority Data

Oct. 16, 1985 [JP] Japan .................................. 60-228840

[51] Int. Cl.$^4$ ................................................. B22F 5/00
[52] U.S. Cl. ..................................... 428/551; 428/548; 428/908.8; 428/911
[58] Field of Search .............. 428/548, 551, 911, 908.8

[56] References Cited

U.S. PATENT DOCUMENTS

| | | | |
|---|---|---|---|
| 3,809,797 | 5/1974 | McMunn et al. .................... | 428/551 |
| 3,918,925 | 11/1975 | McComas ......................... | 428/551 X |
| 3,962,976 | 6/1976 | Kelsey ............................. | 428/911 X |
| 3,980,446 | 9/1976 | Porta et al. ........................ | 428/551 |
| 4,061,815 | 12/1977 | Poole, Jr. .......................... | 428/911 |
| 4,090,011 | 5/1978 | Barkman et al. ................. | 428/911 X |
| 4,323,000 | 4/1982 | Dennis et al. ..................... | 428/911 X |
| 4,377,370 | 3/1983 | Porcelli ............................ | 428/911 X |
| 4,633,756 | 1/1987 | Rudoi .............................. | 428/911 X |
| 4,665,794 | 5/1987 | Gerber et al. .................... | 428/911 X |

Primary Examiner—Peter A. Nelson
Attorney, Agent, or Firm—Wenderoth, Lind & Ponack

[57] ABSTRACT

Disclosed is a composite metal sheet composed of at least two metal sheets and an intermediate resin layer interposed therebetween. The intermediate resin layer in composed of a mixture of an organic polymeric material resin and a metal powder (inclusive of an alloy powder) having a good electroconductivity, a hardness higher than that of the metal sheets, and an average particle size of 80 to 100% of the thickness of the intermediate resin layer. The amount of the metal powder is 1 to 10% by volume based on the intermediate resin layer (a sum of the resin and metal powder) and the metal powder is dispersed substantially uniformly in the intermediate resin layer. The composite metal sheet has excellent electric resistance weldability and adhesion strength.

5 Claims, 3 Drawing Sheets

COMPOSITE METAL SHEET WITH ORGANIC AND METAL INTERMEDIATE LAYER

BACKGROUND OF THE INVENTION

1. Field of the Invention

The present invention relates to a composite metal sheet comprising at least two metal sheets and an intermediate resin layer formed therebetween, which has excellent electric resistance weldability and adhesion strength. This composite metal sheet is useful for a damping sheet, a sound-insulating sheet, a light-weight steel sheet and the like.

2. Description of the Related Art

A composite steel sheet for absorbing vibrations or the like, which comprises at least two steel sheets and a resin layer interposed therebetween, is known, and the present inventors have already proposed composite steel sheets of this type in Japanese Unexamined Patent Publication No. 50-79,920. Also, similar techniques are disclosed in Japanese Unexamined Patent Publications Nos. 53-128,687, 57-24,251, 57-146,649, 57-163,559, 57-163,560 and 58-132,550. None of these composite steel sheets, however, can simultaneously satisfy the electric resistance weldability and adhesion strength requirements.

Japanese Unexamined Patent Publication No. 57-146,649 teaches that an electrically conductive substance such as iron powder, mill scale or carbon graphite powder is incorporated into an intermediate resin layer so that it occupies 10 to 50% by weight of the intermediate resin layer, and that at least 50% by volume of the electrically conductive substance consists of particles having a particle size not smaller than one half the thickness of the intermediate resin. As specific examples of the electrically conductive substance, the above publication discloses carbon graphite and mill scale in which particles having a particle size of 150 to 325 mesh (i.e., about 100 to about 50 $\mu$m) occupy at least 50% by volume of the total particles. When the thus-disclosed composite steel sheet is subjected to electric resistance welding under a pressure, the welding current must be increased to a level higher than in the case of ordinary steel sheets. However, the allowable range of the applied electric current is very narrow, and if the electric current exceeds the permissible upper limit to even a slight degree, an electric connection occurs at points other than the welding points whereby sparks are generated and the steel sheet is readily perforated. If the amount of electrically conductive particles is increased to make it possible to perform welding with a small electric current under a low pressure, the adhesion strength is reduced.

SUMMARY OF THE INVENTION

It is a primary object of the present invention to provide a composite metal sheet having excellent electric resistance weldability and adhesion strength, which is easily welded by electric resistance welding.

Another object of the present invention is to provide a composite metal sheet having excellent vibration-absorbing and sound-insulating characteristics, and having a relatively light weight.

In accordance with the present invention, there is provided a composite metal sheet having excellent electric resistance weldability and adhesion strength, which comprises at least two metal sheets and an intermediate layer interposed therebetween, the intermediate layer being composed of a mixture of an organic polymeric material resin and a metal powder (inclusive of an alloy powder) having a good electroconductivity, wherein the hardness of the metal powder is higher than that of the metal sheets, the average particle size of the metal powder is 80 to 100% of the thickness of the intermediate resin layer, the amount of the metal powder is 1 to 10% by volume based on the intermediate resin layer (the sum of the resin and metal powder) and the metal powder is dispersed substantially uniformly in the intermediate resin layer.

DESCRIPTION OF THE PREFERRED EMBODIMENTS

Figure 1:
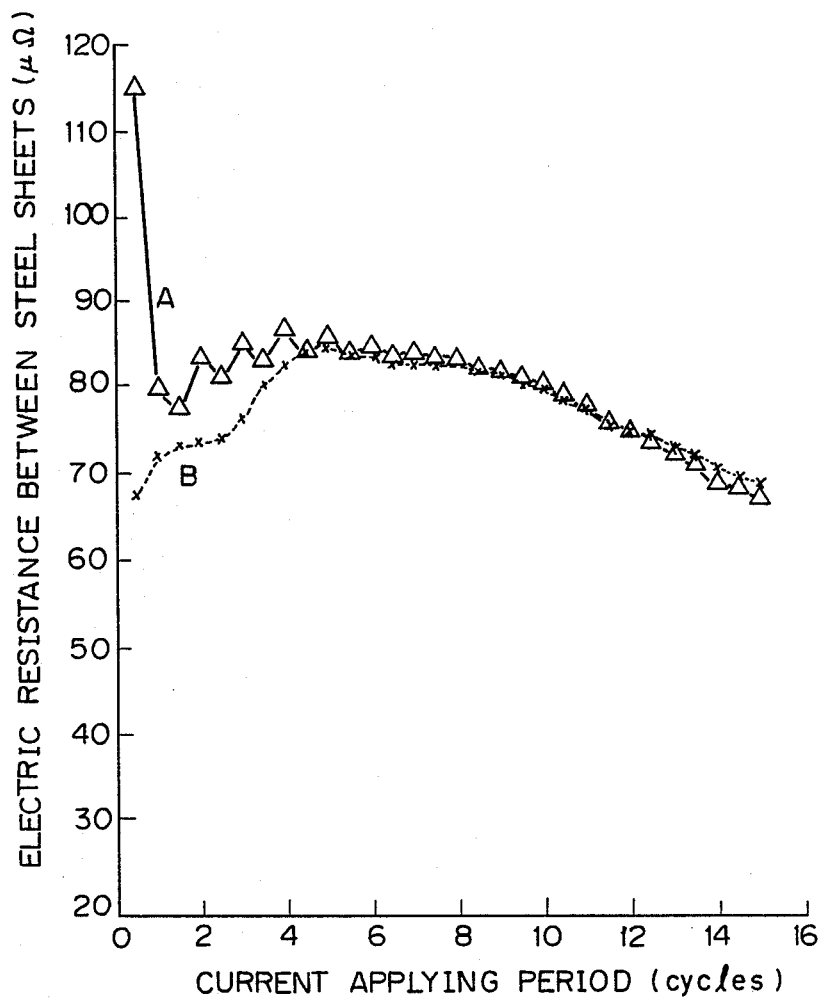
FIG. 1 shows the change of the electric resistance between steel sheets with the lapse of time at the electric resistance welding step.

The composite metal sheet of the present invention comprises at least two metal sheets and an intermediate resin layer interposed therebetween, the intermediate resin layer being composed of a mixture of an organic polymeric material resin and a metal powder having a good electroconductivity.

For the metal sheet, there can be mentioned a steel sheet, a high tensile steel sheet, a plated steel sheet, a chemically converted steel sheet, an aluminum sheet and a titanium sheet. Generally, the thickness of the metal sheet is about 0.3 mm to about 0.8 mm.

The composite metal sheet of the present invention can be prepared according to methods similar to those adopted for the production of conventional composite metal sheets. According to a typical method, an organic polymeric material resin is dissolved in a solvent, a metal powder having a good electroconductivity is added to the solution, and the mixture is stirred to disperse the metal powder substantially uniformly in the resin. The thus-obtained slurry is coated on a metal sheet and the solvent is evaporated. Two metal sheets having the thus-formed resin-metal powder coating layer are placed together so that the coating layers confront each other, and the metal sheets are press-bonded under heating.

In the present invention, it is important that a metal powder having an average particle size corresponding to 80 to 100% of the thickness of the resin-metal powder intermediate layer and a hardness higher than that of the metal sheets should be used as the metal powder having a good electroconductivity. When the composite metal sheet is subjected to spot welding, that is, when electric resistance welding is carried out while applying an electric current in the state where a pressing force is imposed on the composite metal sheet by the top ends of electrode tips, the metal sheets are locally deformed by this pressing force, but the metal powder is not deformed because the hardness is high. Furthermore, since the average particle size of the metal powder is close to the thickness of the resin-metal powder intermediate layer, each particle of the metal powder breaks through the resin film present in the periphery thereof, especially the resin film interposed between the particles and the metal sheets, and the particles come into direct contact with the metal sheets. Accordingly, an electric current flows only between the confronting top end portions of the electrode tips and welding is possible only in this limited portion. If the average particle size of the metal powder is smaller than 80% of the thickness of the intermediate layer, the metal powder is buried in the resin layer, and even if the composite metal sheet is pressed by the top ends of the electrode tips, the particles are not sufficiently placed in contact with the metal sheets, and therefore a good electric conduction cannot be obtained. If the average particles size of the metal powder is larger than 100% of the thickness of the intermediate layer, when the composite metal sheets are pressed by the electrodes, contact of the metal powder with the metal sheets occurs in portions other than the pressed portion, and the initial welding current flows through many routes in addition to the normal route between the electrode tips. Accordingly, sparks are generated at points other than the welding point, resulting in undesirable discoloration and perforation of the metal sheet. If the hardness of the metal powder is not higher than the hardness of the metal sheet, the metal powder does not sufficiently break the resin film when pressed by the electrodes, and a satisfactory electric connection cannot be made between the metal powder and the metal sheets.

The change of the flow of the electric current with the lapse of time at the electric resistance welding step is shown in FIG. 1, which is observed when a metal powder having the high hardness and the average particle size specified in the present invention is used. Namely, FIG. 1 shows the results of the measurement of the resistance ($\mu\Omega$) between steel sheets during a current applying period of 15 cycles when a pressing force of 250 kg is imposed on the steel sheets by a pair of electrodes each having a top end diameter of 16 mm and a welding current of 6 KA is applied. Curve A indicates the change of the resistance between steel sheets of a stack composed of a steel sheet and a composite steel sheet having a resin intermediate layer between steel sheets. Curve B indicates the change of the resistance between steel sheets of a stack composed of three steel sheets. All of the steel sheets used had a thickness of 0.8 mm. The intermediate resin layer had a thickness of 50 $\mu$m and was composed of an amorphous polyester resin and 3% by volume, based on the intermediate resin layer, of a water-atomized SUS410 stainless steel powder having an average particle size of 44 $\mu$m and a particle size distribution of from 32 $\mu$m to 48 $\mu$m. As is apparent from FIG. 1, the resistance at the start of the resistance welding in Curve A is large, but this resistance is abruptly decreased, and after the passage of 1 cycle, there is no great difference in the resistance between curve A and curve B. Namely, at the initial stage of the application of electricity, no contact is made between the metal powder and the metal sheets and an electric current does not flow, but because of the resistance heat generated by the applied electricity, the resin between the metal powder and metal sheet is heat-fused, metal contact occurs, and an electric current is allowed to flow.

Figure 2:
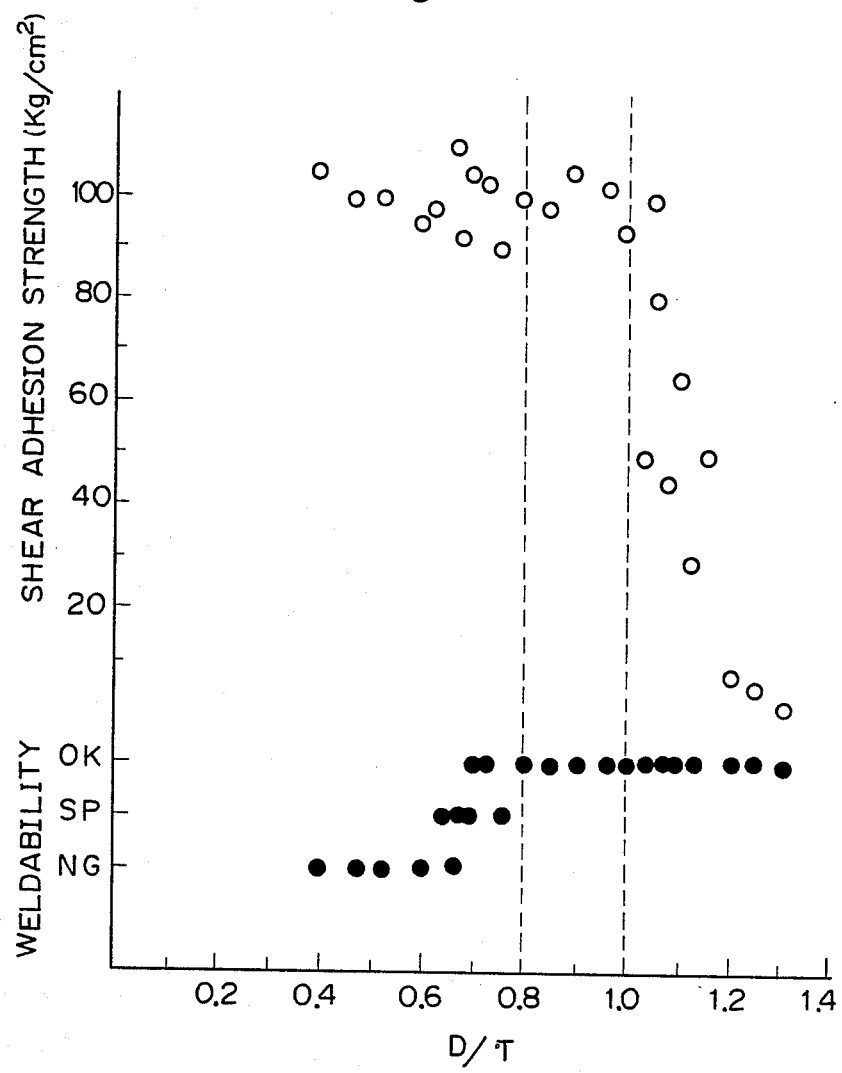
FIG. 2 shows the relationship of the average particle size of the metal powder with the shear adhesion strength and weldability of the composite metal sheet; and, FIG. 3 shows the relationship of the amount by volume of the average particle size of the metal powder in the intermediate resin layer with the shear adhesion strength and weldability of the composite metal sheet.

Furthermore, the average particle size of the metal powder has a close relationship to the shear adhesion strength of the composite metal sheet. The relationship between the average particle size of the metal powder and the weldability and shear adhesion strength is shown in FIG. 2. More specifically, the relationship between the ratio D/T (in which D represents the average particle size (mm) of the metal powder and T represents the thickness (mm) of the intermediate layer) and the weldability and the shear adhesion strength (kg/cm$^2$) is shown in FIG. 2. In the ordinate indicating the weldability, OK indicates a weldability comparable to that of an ordinary steel sheet, SP indicates generation of sparks at points other than the welding point, and NG indicates that an electric current does not flow and that welding is impossible according to ordinary methods.

The resin used for obtaining the results shown in FIG. 2 is an amorphous polyurethane resin and the thickness of the intermediate layer is 30 to 150 $\mu$m. The metal powder used is a water-atomized SUS410 powder having an average particle size of 53 $\mu$m. The metal sheet used is an ordinary steel sheet.

From FIG. 2, it is seen that, to obtain a good weldability and increase the adhesion strength, it is important that the ratio D/T should be 0.8 to 1.0, that is, the average particle size of the metal powder should be 80 to 100% of the thickness of the intermediate layer. The reason why the adhesion strength is abruptly decreased if the ratio D/T exceeds 1 as follows. If the particle size (D) of the metal powder is larger than the thickness (T) of the intermediate layer, even when bonding is attained just after welding, since the metal powder has a hardness higher than those of the resin and metal sheets and has a thickness larger than the resin film, a force acts for separating the metal sheets from each other, and with the recovery of the residual stress of the resin, the adhesion strength of the resin is drastically reduced.

As the metal powder having a good electroconductivity and a hardness higher than that of the metal sheets, there can be mentioned powders of 13-chromium stainless steel, chromium and nickel, and an appropriate powder is selected according to the kind of the metal sheets to be used. When a stainless steel powder is prepared by the water atomizing method, the hardness is remarkably increased. Accordingly, this powder is advantageously used for the production of the composite steel sheet of the present invention.

As pointed out hereinbefore, the particle size of the metal powder is selected according to the thickness of the intermediate layer, and ordinarily, the particle size is selected to be within a range of from 8 to 400 $\mu$m.

Figure 3:
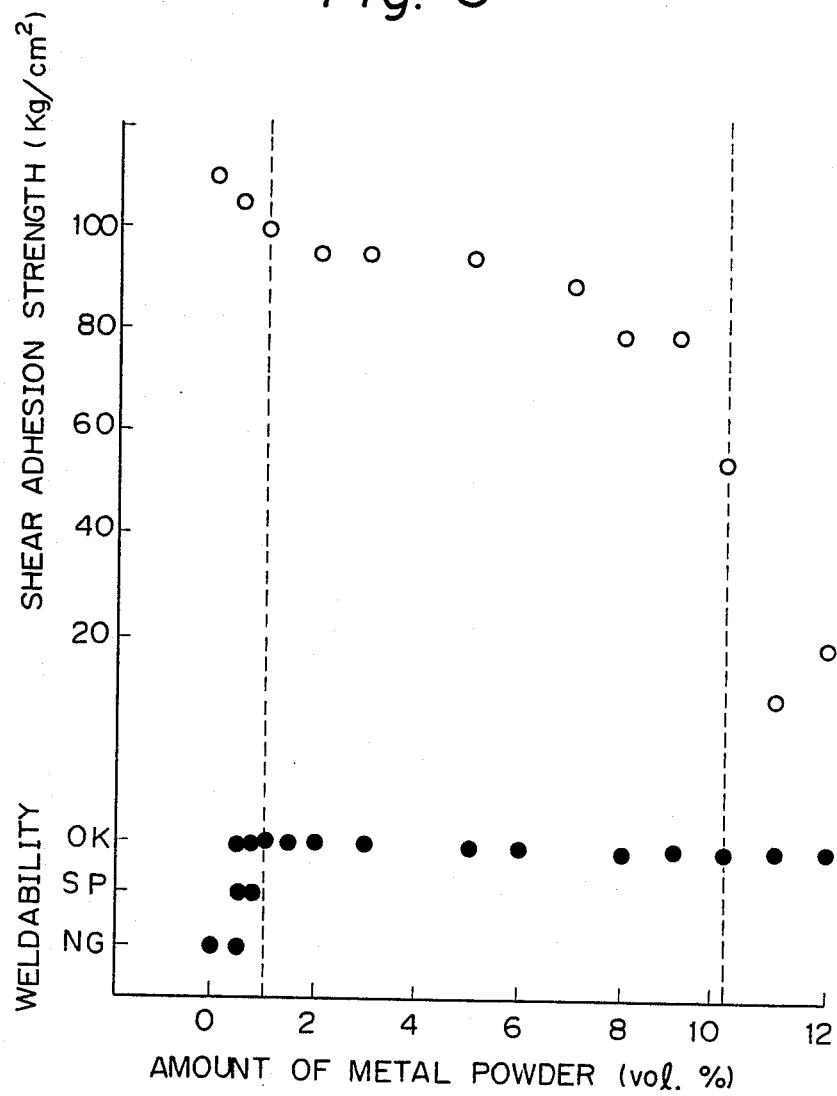

To obtain a composite metal sheet having a combination of a good weldability and a high adhesion strength, it is important that the amount of the metal powder is 1 to 10% by volume based on the intermediate layer (composed of the resin and metal powder). The relationship between the amount of the metal powder and the shear adhesion strength and weldability is shown in FIG. 3. Namely, FIG. 3 shows the results of experiments made on a composite metal sheet formed by using a water-atomized SUS410 powder having an average particle size of 53 $\mu$m as the metal powder, an amorphous polyurethane resin as the resin in the form of a film having a thickness of 60 $\mu$m and ordinary steel sheets as the metal sheets. The other conditions employed were the same as those employed in the experiments shown in FIG. 2. As is apparent from FIG. 3, it is important that the amount of the metal powder is 1 to 10% by volume, preferably 1 to 5% by volume, based on the intermediate layer.

In the present invention, it is important that the metal powder is dispersed substantially uniformly in the resin. Even if the average particle size and amount of the metal powder are within the above-mentioned ranges, when particles of the metal powder cohere to one another in the resin, a metal-free portion can be formed and the weldability degraded in this portion. Accordingly, the metal powder must be dispersed substantially uniformly in the resin. For this purpose, the distance between every two adjacent particles of the metal powder should be 6 mm or less. The top end diameter of the welding electrode is ordinarily 4 mm at a minimum. Accordingly, if the distance between every two adjacent particles is 6 mm or less, a good weldability can be obtained.

The resin constituting the intermediate layer in the present invention is roughly divided into a viscoelastic resin improving the absorption of vibrations and increasing the sound-insulating effect and a resin realizing the weight-decreasing effect according to the intended use of the composite metal sheet.

When a viscoelastic resin having a dynamic loss (tan $\delta$) of at least 0.1 is formed into a layer having a thickness of 10 to 100 $\mu$m, a composite metal sheet having a good damping effect can be obtained. This effect is not particularly enhanced even if the resin thickness is increased beyond the above-mentioned range, but the processability is degraded. As the viscoelastic resin, there can be used polyvinyl acetate, an ethylene/vinyl acetate copolymer, an acrylic acid ester copolymer, polyvinyl chloride, an acrylic rubber, polyisobutylene, a butyl rubber, a butyral resin, an amorphous polyester resin, a polystyrene resin and a styrene copolymer.

When a resin having an elastic modulus of at least $10^{10}$ dyne/cm$^2$ is used, the rigidity of the composite metal sheet is not reduced and the weight can be decreased while maintaining the rigidity at a level comparable to that of an ordinary metal sheet. This weight-decreasing effect is enhanced as the thickness of the resin layer is increased, but if the thickness of the resin layer exceeds 400 $\mu$m, the processability is degraded and all practical utility is lost. If the thickness is smaller than 100 $\mu$m, a substantial weight-decreasing effect cannot be realized. Accordingly, in this case, preferably the thickness of the intermediate layer is 100 to 400 $\mu$m.

As the resin having an elastic modulus of at least $10^{10}$ dyne/cm$^2$, there can be mentioned polyolefins such as polyethylene and polypropylene and a crystal polyester resin.

When the composite metal sheet of the present invention is formed into a construction member, electric resistance welding is carried out while applying electricity to the composite metal sheet alone or to a stack of composite metal sheets, while pressing thereon with the top ends of electrode tips. Known means and conditions may be adopted for the electric resistance welding.

Since the electrical conduction efficiency of the intermediate layer in the composite metal sheet is high, the welding adhesion between the metal sheets is good and the adhesion strength between the intermediate layer and the metal sheets is high. Accordingly, separation of the metal sheets does not occur and the mechanical processability is excellent. Therefore, the composite metal sheet of the present invention can be advantageously used as a damping sheet, a sound-insulating sheet, a light-weight steel sheet and the like.

The present invention will now be described in detail with reference to the following example that by no means limits the scope of the invention.

Various composite metal sheets were prepared according to the specifications shown in Table 1. Each composite metal sheet was subjected to spot welding under the following welding conditions.

Pressing force: 200 kg
Quantity of applied electricity: 7.0 KA
Welding time: 6/50 seconds
Top end diameter of electrode tips: 4.0 mm The weldability was compared with that of an ordinary steel sheet, and the adhesion strength was compared with that of a composite metal sheet comprising an intermediate resin layer in which a metal powder was not incorporated. The obtained results are shown in Table 1.

In the column "Weldability" of Table 1, A indicates a weldability comparable to that of an ordinary steel sheet and B indicates a weldability inferior to that of an ordinary steel sheet, and in the column "Adhesion Strength", A indicates an adhesion strength higher than one half the adhesion strength of the metal powder-free control composite metal sheet and B indicates an adhesion strength lower than one half the control sheet.

TABLE 1

| Sample No. | Metal sheet Kind | Metal sheet Thickness (mm) | Resin Kind | Resin Thickness ($\mu$m) | Metal powder Kind | Metal powder Particle size ($\mu$m) | Volume (%) | Weldability | Adhesion strength |
|---|---|---|---|---|---|---|---|---|---|
| 1 | Steel | 0.6 | Amorphous polyester | 30 | SUS410 | 27 | 1.0 | A | A |
| 2 | " | 0.6 | Amorphous polyester | 50 | " | 44 | 1.5 | A | A |
| 3 | " | 0.6 | Amorphous polyester | 70 | " | 66 | 4.5 | A | A |
| 4 | " | 0.6 | Amorphous polyester | 100 | " | 86 | 8.0 | A | A |
| 5 | " | 0.6 | Acrylic | 50 | " | 44 | 1.5 | A | A |
| 6 | " | 0.6 | " | 50 | SUS430 | 44 | 1.5 | A | A |
| 7 | " | 0.3 | Nylon | 400 | SUS410 | 360 | 1.2 | A | A |
| 8 | Aluminum | 0.8 | Amorphous polyester | 50 | " | 44 | 2.0 | A | A |
| 11 | Steel | 0.6 | Amorphous polyester | 50 | SUS410 | 66 | 1.5 | A | B |
| 12 | " | 0.6 | Amorphous polyester | 100 | " | 74 | 1.5 | B | A |
| 13 | " | 0.6 | Amorphous polyester | 50 | " | 60 | 1.2 | A | B |
| 14 | " | 0.6 | Amorphous | 50 | Graphite | 44 | 1.5 | B | A |

TABLE 1-continued

| | Metal sheet | | Resin | | Metal powder | | | | |
|---|---|---|---|---|---|---|---|---|---|
| Sample No. | Kind | Thickness (mm) | Kind | Thickness (μm) | Kind | Particle size (μm) | Volume (%) | Weldability | Adhesion strength |
| 15 | " | 0.6 | polyester Amorphous polyester | 50 | Aluminum | 44 | 1.5 | B | A |
| 16 | " | 0.6 | Amorphous polyester | 50 | Gas-atomized steel | 44 | 1.5 | B | A |
| 17 | " | 0.6 | Amorphous polyester | 50 | Iron powder | 44 | 1.5 | B | A |

Note
Samples 1 through 8: samples according to the present invention
Samples 11 through 17: comparative samples In all the samples according to the present invention, the average particle size of the metal powder is in the range of 80 to 100% of the thickness of the intermediate layer, and the hardness of the metal powder is higher than the hardness of the metal sheets. Therefore, both the weldability and the adhesion strength are excellent. In comparative samples 11 and 13, the hardness of the metal powder is higher than the hardness of the metal sheets but the particle size of the metal powder is larger than the thickness of the intermediate layer. Accordingly, the weldability is good but the adhesion strength is poor. In contrast, in comparative sample 12, the particle size is smaller than 80% of the thickness of the intermediate layer, and therefore, the weldability is poor. In comparative samples 14 through 17, since the hardness of the metal powder is lower than the hardness of the metal sheets, the weldability is poor.

We claim:

1. A composite metal sheet having excellent electric resistance, weldability and adhesion strength, which comprises at least two metal sheets and an intermediate resin interposed therebetween, each metal sheet having a thickness of about 0.3 mm. to about 0.8 mm., said intermediate layer being composed of a mixture of an organic polymeric material resin and a metal powder (inclusive of an alloy powder) having a good electro-conductivity, said intermediate layer having a thickness of 10 μm to 400 μm, wherein the hardness of the metal powder is higher than that of the metal sheets, the average particle size of the metal powder is 80 to 100% of the thickness of the intermediate resin layer, the amount of the metal powder is 1 to 10% by volume based on the intermediate resin layer (a sum of the resin and metal powder) and the metal powder is dispersed substantially uniformly in the intermediate resin layer.

2. The composite metal sheet as set forth in claim 1, wherein the particle size of the metal powder is 8 to 400 μm.

3. The composite metal sheet as set forth in claim 1, wherein the resin is a viscoelastic resin.

4. The composite metal sheet as set forth in claim 1, wherein the resin is a weight-decreasing resin.

5. The composite metal sheet as set forth in claim 1, wherein the metal powder is prepared by a water-atomizing method.

* * * * *